(12) United States Patent
Jung et al.

(10) Patent No.: US 11,989,931 B2
(45) Date of Patent: May 21, 2024

(54) METHOD AND APPARATUS WITH OBJECT CLASSIFICATION

(71) Applicant: SAMSUNG ELECTRONICS CO., LTD., Suwon-si (KR)

(72) Inventors: Sangil Jung, Yongin-si (KR); Seungin Park, Yongin-si (KR); Byung In Yoo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 139 days.

(21) Appl. No.: 17/697,160

(22) Filed: Mar. 17, 2022

(65) Prior Publication Data
US 2023/0095716 A1 Mar. 30, 2023

(30) Foreign Application Priority Data
Sep. 24, 2021 (KR) .......... 10-2021-0126062

(51) Int. Cl.
G06V 10/80 (2022.01)
G06V 10/40 (2022.01)
G06V 10/764 (2022.01)
G06V 10/77 (2022.01)
G06V 10/82 (2022.01)

(52) U.S. Cl.
CPC .......... G06V 10/806 (2022.01); G06V 10/40 (2022.01); G06V 10/764 (2022.01); G06V 10/7715 (2022.01); G06V 10/82 (2022.01)

(58) Field of Classification Search
CPC .... G06V 10/806; G06V 10/40; G06V 10/764; G06V 10/7715; G06V 10/82; G06V 10/454
See application file for complete search history.

(56) References Cited

U.S. PATENT DOCUMENTS 7,599,554 B2   10/2009   Agnihotri et al.
8,711,248 B2    4/2014   Jandhyala et al.
8,763,114 B2    6/2014   Alperovitch et al.
(Continued)

FOREIGN PATENT DOCUMENTS

KR       10-0924690 B1   11/2009
KR    10-2013-0060274 A   6/2013
(Continued)

OTHER PUBLICATIONS

Krizhevsky, Alex, et al. "ImageNet Classification with Deep Convolutional Neural Networks." *Advances in neural information processing systems* vol. 25 (2012). pp. 1-9 (9 pages in English).
(Continued)

*Primary Examiner* — Md K Talukder
(74) *Attorney, Agent, or Firm* — NSIP Law

(57) ABSTRACT

An object classification method and apparatus are disclosed. The object classification method includes receiving an input image, storing first feature data extracted by a first feature extraction layer of a neural network configured to extract features of the input image, receiving second feature data from a second feature extraction layer which is an upper layer of the first feature extraction layer, generating merged feature data by merging the first feature data and the second feature data, and classifying an object in the input image based on the merged feature data.

17 Claims, 6 Drawing Sheets

(56) References Cited

U.S. PATENT DOCUMENTS

| | | | |
|---|---|---|---|
| 9,536,293 | B2 | 1/2017 | Lin et al. |
| 10,002,313 | B2 | 6/2018 | Vaca Castano et al. |
| 10,304,233 | B2 | 5/2019 | Oh |
| 2017/0061328 | A1* | 3/2017 | Majumdar ............ G06V 10/454 |
| 2017/0169315 | A1 | 6/2017 | Vaca Castano et al. |
| 2021/0089823 | A1* | 3/2021 | Iio ......................... G06V 10/764 |
| 2022/0092351 | A1* | 3/2022 | Huang .................... G06V 10/95 |
| 2022/0172378 | A1* | 6/2022 | Sharma ................ G06V 10/764 |
| 2023/0095716 | A1* | 3/2023 | Jung .................... G06V 10/806 |
| | | | 382/156 |

FOREIGN PATENT DOCUMENTS

| | | |
|---|---|---|
| KR | 10-2013-0073852 A | 7/2013 |
| KR | 10-1479225 B1 | 1/2015 |
| KR | 10-2016-0142760 A | 12/2016 |
| KR | 10-2020-0101514 A | 8/2020 |
| KR | 10-2249663 B1 | 5/2021 |
| WO | WO 2020/104542 A1 | 5/2020 |

OTHER PUBLICATIONS

Simonyan, Karen, et al. "Very Deep Convolutional Networks for Large-Scale Image Recognition." arXiv:1409.1556 ver. 6 [cs.CV] Apr. 10, 2015. pp. 1-14 (14 pages in English).

He, Kaiming, et al. "Deep Residual Learning for Image Recognition." *Proceedings of the IEEE conference on computer vision and pattern recognition.* 2016. pp. 770-778 (9 pages in English).

Howard, Andrew G., et al. "Mobilenets: Efficient Convolutional Neural Networks for Mobile Vision Applications." arXiv:1704.04861v1 [cs.CV] Apr. 17, 2017. (9 pages in English).

Dosovitskiy, Alexey, et al. "An Image is Worth 16x16 Words: Transformers for Image Recognition at Scale." arXiv:2010.11929v2 [cs.CV] Jun. 3, 2021. pp. 1-22 (22 pages in English).

Heo, Byeongho, et al. "Rethinking Spatial Dimensions of Vision Transformers." *Proceedings of the IEEE/CVF International Conference on Computer Vision.* 2021. arXiv:2103.16302v2 [cs.CV] Aug. 18, 2021. (10 pages in English).

Li Ce et al., "Deformation and Refined Features based Lesion Detection on Chest X-Ray," IEEE Access, vol. 8, Jan. 2, 2020, pp. 14675-14689.

Extended European Search Report dated Oct. 5, 2022, in counterpart European Patent Application No. 22169643.8 (60 Pages).

\* cited by examiner

METHOD AND APPARATUS WITH OBJECT CLASSIFICATION

CROSS-REFERENCE TO RELATED APPLICATIONS

This application claims the benefit under 35 USC § 119(a) of Korean Patent Application No. 10-2021-0126062 filed on Sep. 24, 2021, in the Korean Intellectual Property Office, the entire disclosure of which is incorporated herein by reference for all purposes.

BACKGROUND

1. Field

The following description relates to a method and apparatus with object classification.

2. Description of Related Art

Objects in an image may be recognized or classified by implementing a recognition model, for example, a classifier. The neural network may be implemented to output a recognition result corresponding to an input pattern of input information. The neural network may provide computationally intuitive mappings between input patterns and output patterns, after substantial training. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a processor-implemented object classification method includes receiving an input image; storing first feature data extracted by a first feature extraction layer of a neural network configured to extract features of the input image; receiving second feature data from a second feature extraction layer; generating merged feature data by merging the first feature data and the second feature data; and classifying an object in the input image based on the merged feature data.

The second feature extraction layer may be an upper layer of the first feature extraction layer.

The second feature extraction layer may be an uppermost feature extraction layer among a plurality of feature extraction layers comprised in the neural network.

The generating of the merged feature data may include determining a weight to be applied to the first feature data; applying the determined weight to the first feature data and determining first feature data to which the weight is applied; and generating the merged feature data by merging the second feature data and the first feature data to which the weight is applied.

The generating of the merged feature data may include performing the merging through an inner product between a feature map corresponding to the first feature data and a feature vector corresponding to the second feature data.

The generating of the merged feature data may include converting the second feature data such that a dimension of the second feature data corresponds to a dimension of the first feature data; and generating merged feature data by merging the converted second feature data and the first feature data.

The generating of the merged feature data may include converting the merged feature data such that a dimension of the merged feature data corresponds to the dimension of the second feature data.

The generating of the merged feature data may include generating first merged feature data by merging the first feature data and the second feature data; and generating second merged feature data by merging the first merged feature data and third feature data extracted by a third feature extraction layer which is a lower layer of the first feature extraction layer, wherein classifying the object in the input image may include classifying the object in the input image based on the second merged feature data.

The generating of the second merged feature data may include converting the first merged feature data such that a dimension of the first merged feature data corresponds to a dimension of the third feature data; and generating the second merged feature data by merging the converted first merged feature data and the third feature data.

The first feature data may include a local feature of the input image, and the second feature data comprises a global feature of the input image.

In a general aspect, a processor-implemented object classification method includes receiving an input image; storing feature data extracted by a feature extraction layer of a neural network configured to extract features of the input image; generating merged feature data by merging class vector data corresponding to the input image and the feature data; and classifying an object in the input image based on the merged feature data.

The generating of the merged feature data may include selecting one or more candidate classes from among a plurality of candidate classes for the object in the received input image; and generating the merged feature data by merging class vector data of the selected one or more candidate classes and the feature data.

The storing of the feature data may include storing feature data extracted by each of feature extraction layers of the neural network, wherein the generating of the merged feature data may include generating the merged feature data by sequentially merging the class vector data and sets of feature data extracted by the feature extraction layers.

The generating of the merged feature data may include converting the class vector data such that a dimension of the class vector data corresponds to a dimension of the feature data; and generating merged feature data by merging the converted class vector data and the feature data.

In a general aspect, an object classification apparatus implementing a neural network, the apparatus includes one or more processors configured to: receive an input image; store first feature data extracted by a first feature extraction layer of the neural network; receive second feature data from a second feature extraction layer; generate merged feature data by merging the first feature data and the second feature data; and classify an object in the input image based on the merged feature data.

The second feature extraction layer may be an upper layer of the first feature extraction layer.

The second feature extraction layer may be an uppermost feature extraction layer among a plurality of feature extraction layers comprised in the neural network.

The processor may be further configured to: generate first merged feature data by merging the first feature data and the second feature data; generate second merged feature data by merging the first merged feature data and third feature data extracted from a third feature extraction layer which is a lower layer of the first feature extraction layer; and classify the object based on the second merged feature data.

In a general aspect, an object classification apparatus implementing a neural network, the apparatus includes one or more processors configured to receive an input image; store feature data extracted by a feature extraction layer of the neural network; generate merged feature data by merging class vector data corresponding to the input image and the feature data; and classify an object in the input image based on the merged feature data.

The processor may be further configured to: select one or more candidate classes from among a plurality of candidate classes for the object in the input image; and generate the merged feature data by merging class vector data of the selected one or more candidate classes and the feature data.

The processor may be further configured to: store feature data extracted by each of feature extraction layers of the neural network; and generate the merged feature data by sequentially merging the class vector data and sets of feature data extracted by the feature extraction layers of the neural network.

In a general aspect, an electronic apparatus includes one or more processors, configured to: store first feature data extracted by a first feature extraction layer of a neural network configured to extract features of an input image; obtain second feature data from a second feature extraction layer which is an upper layer of the first feature extraction layer; generate merged feature data by merging the first feature data and the second feature data; and classify an object in the input image based on the merged feature data.

The apparatus may further include a memory storing instructions that, when executed by the one or more processors, configure the one or more processors to perform the storing of first feature data, the obtaining of the second feature data, the generating of the merged feature data, and the classifying of the object in the input image.

In a general aspect, a processor-implemented method includes receiving input data; receiving global information of the input image, and generating first feature data corresponding to the global information; receiving local information of the input image, and generating second feature data corresponding to the local information; generating merged feature data by merging the feature data corresponding to the global information and the feature data corresponding to the local information; and classifying an object in the input image based on the generated merged feature data.

The feature data may include one of a feature vector, a feature map, activation data and an activation map.

The generating of the merged feature data may be based on an inner product between a feature map corresponding to the first feature data and a feature vector corresponding to the second feature data.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
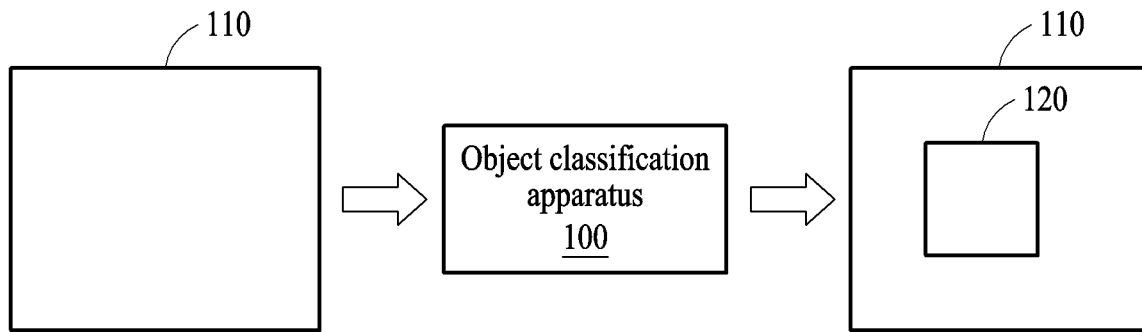
FIG. 1 illustrates an example overview of the operation of an example object classification apparatus configured to classify an object in an image, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description may cause ambiguous interpretation of the example embodiments. Hereinafter, examples will be described in detail with reference to the accompanying drawings, and like reference numerals in the drawings refer to like elements throughout.

One or more examples relate to the extracting of a feature from an image and classifying an object based on the extracted feature.

FIG. 1 illustrates an example of an overview of the operation of an object classification apparatus that is configured to classify an object in an image, in accordance with one or more embodiments.

Referring to FIG. 1, an object classification apparatus 100, configured to classify an object in an input image, may perform image recognition (or visual recognition). The image recognition may include detecting an object 120 in an input image 110, and identifying the object 120 or classifying a type of the object 120 as one of different types of objects. In an example the input image 110 may be a still image or a moving image (or a video), and may correspond to a color image, a black-and-white image, a gray image, an infrared image, or a depth image, as only examples. The term "input image" used herein may also be simply referred to as an "image." The term "object" used herein may be construed as a target object to be classified in an input image, for example, a human being, an animate or inanimate being, and the like. A type of an object to be classified may be defined in advance as a specific type (e.g., a human being, an imaging device, etc.) or may not be limited to a specific one. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The object classification apparatus 100 may be applied to various fields. In an example, the object classification apparatus 100 may be used to detect a human being, a pose or movement of the human being, and the presence of a specific object in an image. Additionally, in an example, the object classification apparatus 100 may be used in a monitoring system for closed-circuit television (CCTV) monitoring, military boundary monitoring, and the like, a sports game analysis, a smart campus, a video conference system, and the like. The object classification apparatus 100 may also be used in other fields where object detection and object classification in an image may be beneficial. The object classification apparatus 100 may be applied to various imaging devices (such as, but not limited to, a smartphone, a digital camera, a TV, a personal digital assistant (PDA), a laptop computer, a tablet computer, etc.) that need image recognition.

In an object classification process, the input image 110, which is a target of object classification, may be input to the object classification apparatus 100. According to examples, image preprocessing may be performed on the input image 110 before the input image 110 is input to the object classification apparatus 100. The image preprocessing may include one or more processes of transforming the input image 110 into a more suitable form to detect an object. The image preprocessing may include, for example, adjusting the size/resolution of the input image 110, rotating the input image 110, removing noise, adjusting contrast, correcting distortion, deblurring, cropping, and the like. When the image preprocessing is performed, the input image 110 obtained through the image preprocessing may be input to the object classification apparatus 100.

The object classification apparatus 100 may classify an object in the input image 110 by implementing a neural network (e.g., a neural network 320 of FIG. 3 or a neural network 520 of FIGS. 5 and 6) operating as an object classification model. The neural network may be trained in advance based on training data, and may provide a great discrimination ability in object classification through non-linear mappings. The neural network may include a plurality of layers. The layers may include an input layer, at least one hidden layer, and an output layer. For example, the deep neural network may include an input layer to which input data is applied, an output layer for outputting a result derived through prediction based on training and the input data, and a plurality of hidden layers for performing a neural network operation between the input layer and the output layer.

Technological automation of object recognition or classification, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

The neural network may map an input and an output that are in a nonlinear relationship based on deep learning to perform object recognition, object classification, and the like. Deep learning is a machine learning scheme for solving a provided problem from a big data set. Deep learning is a process of optimizing a neural network, which includes finding a model or weight representing a structure of the neural network.

The neural network may be a deep neural network (DNN), for example, a convolutional neural network (CNN). In such an example, the DNN may be one or more of a fully connected network, a convolution neural network, a recurrent neural network, and the like, or may include different or overlapping neural network portions respectively with such full, convolutional, or recurrent connections, according to an algorithm used to process information.

However, examples of the neural network used by the object classification apparatus 100 are not limited the foregoing example. For example, a neural network of another structure may also be used as the object classification model without limitation. Hereinafter, a CNN will be mainly described as an example of the neural network for convenience of description.

The CNN may be suitable for processing two-dimensional (2D) data such as the input image 110. The CNN may include a convolution layer, a pooling layer, and a fully-connected layer. Through an operation performed in each layer, the CNN may extract feature data from the input image 110 input to the object classification model or provide an object classification result. The object classification result described herein may refer to a result of classifying an object in an input image.

The CNN may perform a convolution operation between an input map and a weight kernel to process 2D data. However, in an environment with limited resources, such as, for example, a mobile terminal, performing such a convolution operation may consume a large amount of resources and a relatively long processing time. Typically, object classification performed in a mobile terminal may need to be able to operate in an environment with limited resources, and may need to be able to provide a high level of performance in object classification. In an example, an always-on face presence detection or anti-spoofing function operating in a mobile device or sensor may need to be able to operate using only limited memory and low power. To satisfy such features, a low-resolution input image and a lightweight neural network having relatively fewer parameters may be used. Although using the low-resolution input image and the lightweight neural network may reduce memory/power consumption and computation amount, accuracy may be degraded. To solve the foregoing, an object classification method that uses fewer resources, yet has a high level of accuracy, may be needed.

Additionally, when implementing the neural network to extract feature data for object classification, local information of an input image may be gradually lost through the layers of the neural network. This characteristic may be more clearly exhibited when the size of the neural network is extremely small. The implementation of such a lightweight neural network is more beneficial for the application of object classification to mobile devices or sensors. Thus, encoding local information using fewer resources and increasing the accuracy in object classification may also be beneficial.

The object classification method performed by the object classification apparatus 100 described herein may satisfy the foregoing aspects by performing object classification by merging global information and local information of the input image 110. The object classification apparatus 100 may merge feature data (e.g., a global feature vector or class vector) corresponding to the global information and feature data corresponding to the local information, and perform object classification based on the merged feature data. Through the object classification method, the object classification apparatus 100 may obtain high accuracy in object classification by implementing a lightweight neural network. Using the merged feature data in which the feature data corresponding to the global information and the feature data corresponding to the local information are merged, the object classification apparatus 100 may improve accuracy while minimizing increases in memory usage, power consumption, and computation amount. The feature data corresponding to the global information and the feature data corresponding to the local information may be extracted by the neural network.

Hereinafter, the object classification method performed by the object classification apparatus 100 will be described in detail.

Figure 2:
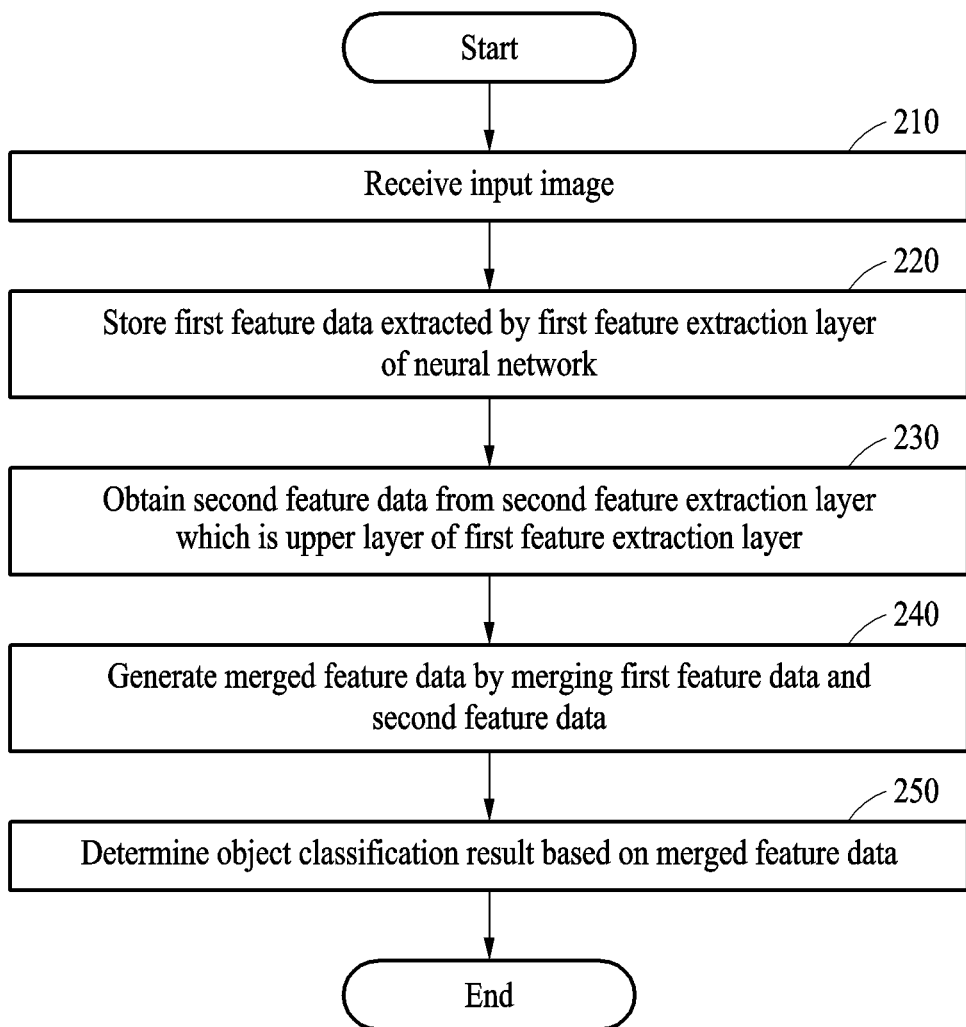
FIG. 2 illustrates an example of an object classification method, in accordance with one or more embodiments.

FIG. 2 illustrates an example of an object classification method. Operations of the object classification method to be described hereinafter with reference to FIG. 2 may be performed by an object classification apparatus, for example, the object classification apparatus 100 described above with reference to FIG. 1 or an object classification apparatus 700 to be described later with reference to FIG. 7. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, the object classification apparatus 100 may receive an input image 110. The input image 110 may be a target image on which object recognition and object classification is to be performed.

In operation 220, the object classification apparatus may store first feature data extracted by a first feature extraction layer of a neural network configured to extract features of the input image. The neural network may include a plurality of feature extraction layers, and the feature extraction layers may be of a hierarchical structure. The term "feature data" used herein may correspond to a feature vector, a feature map, activation data, or an activation map.

In operation 230, the object classification apparatus 100 may obtain second feature data from a second feature extraction layer which is an upper layer of the first feature extraction layer. In an example, the second feature extraction layer may be an uppermost feature extraction layer among the feature extraction layers included in the neural network.

The first feature data may include a local feature of the input image, and the second feature data may include a global feature of the input image.

In operation 240, the object classification apparatus may generate merged feature data by merging the first feature data and the second feature data. In an example, the object classification apparatus may perform the merging of the feature data based on an inner product between a feature map corresponding to the first feature data and a feature vector corresponding to the second feature data.

In an example, when generating the merged feature data, the object classification apparatus may apply a weight. The object classification apparatus may determine a weight to be applied to the first feature data, and apply the determined weight to the first feature data to determine first feature data to which the weight is applied. In this example, the object classification apparatus may generate merged feature data by merging the second feature data and the first feature data to which the weight is applied.

When generating the merged feature data, the object classification apparatus may convert the second feature data such that a dimension of the second feature data corresponds to a dimension of the first feature data, and generate merged feature data by merging the converted second feature data and the first feature data. Subsequently, the object classification apparatus may convert the merged feature data such that a dimension of the merged feature data corresponds to the dimension of the second feature data.

In operation 250, the object classification apparatus may determine a result of classifying an object in the input image based on the merged feature data. The object classification apparatus may determine this object classification result based on a classifier that is trained to output an object classification result based on input merged feature data.

In an example, the object classification apparatus may store sets of feature data corresponding to local features output from a plurality of feature extraction layers, and sequentially merge feature data corresponding to a global feature and the sets of feature data corresponding to the local features. In an example, the object classification apparatus may generate first merged feature data by merging the first feature data and the second feature data, and then generate second merged feature data by merging the first merged feature data and third feature data extracted by a third feature extraction layer which is a lower layer of the first feature extraction layer. The object classification apparatus may convert the first merged feature data such that a dimension of the first merged feature data corresponds to a dimension of the third feature data, and generate the second merged feature data by merging the converted first merged feature data and the third feature data. The object classification apparatus may determine an object classification result based on the second merged feature data.

Figure 3:
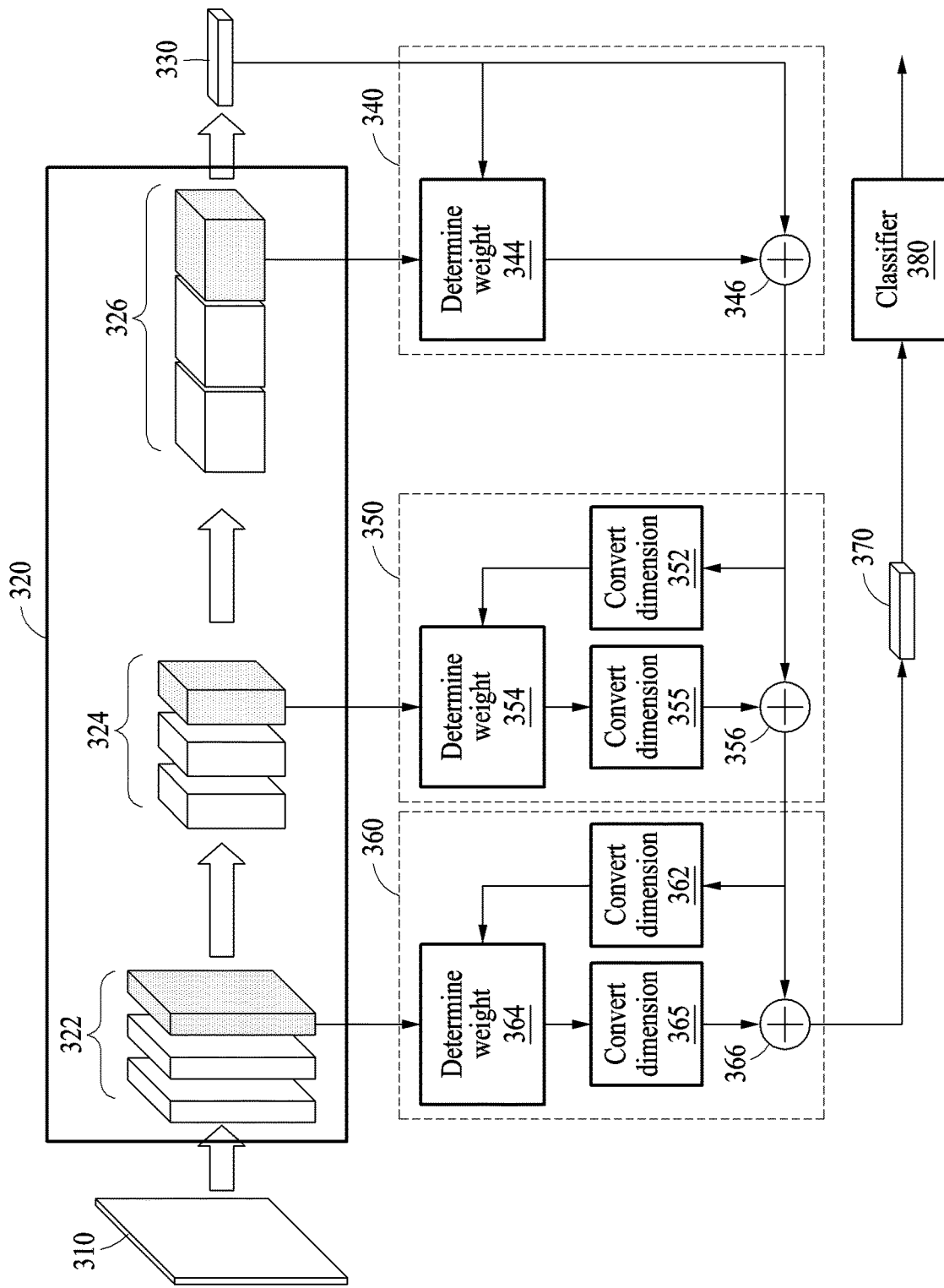
FIG. 3 illustrates an example of object classification implementing a neural network, in accordance with one or more embodiments.

FIG. 3 illustrates an example of object classification implementing a neural network, in accordance with one or more embodiments.

Referring to FIG. 3, an object classification apparatus (e.g., the object classification apparatus 100 of FIG. 1, or an object classification apparatus 700 of FIG. 7) may obtain feature data 330 from an input image 310 by implementing a neural network 320 that performs feature extraction. The feature data 330 may include a global feature of the input image 310, which corresponds to second feature data described herein. The feature data 330 may be encoded through a backbone of the neural network 320.

In an example, the neural network 320 may be a CNN including a convolution layer, a nonlinear activation function layer, and a pooling layer. The pooling layer may reduce features by gradually reducing the resolution of an image. The input image 310 may be finally represented as the feature data 330 by the CNN. The feature data 330 may include information of an entirety of the input image 310.

The neural network 320 may include a plurality of feature extraction devices 322, 324, and 326, and each of the respective feature extraction devices 322, 324, and 326 may include a plurality of layers including, for example, a convolution layer, a nonlinear activation function layer, and a pooling layer. The feature extraction devices 322, 324, and 326 may correspond to convolution units. In the example of FIG. 3, the neural network 320 is illustrated as including the three feature extraction devices 322, 324, and 326 for convenience of description. However, examples are not limited thereto.

The feature extraction devices 322, 324, and 326 may have a hierarchical structure in which the feature extraction device 326 includes an uppermost feature extraction layer and the feature extraction device 322 includes a lowermost feature extraction layer. Local feature data may be extracted from each of the feature extraction devices 322, 324, and 326, and the extracted local feature data may be stored. The extracted local feature data may be a feature map, for example. In an example, a first feature map may be extracted from the feature extraction device 322, a second feature map may be extracted from the feature extraction device 324, and an Nth feature map may be extracted from the feature extraction device 326. The feature data 330 corresponding to global feature data may be obtained from the neural network 320 by applying average pooling to the feature data extracted from the feature extraction device 326.

The object classification apparatus may merge local feature data extracted from the feature extraction devices 322, 324, and 326, while passing the feature data 330 from an upper layer to a lower layer of the hierarchical feature extraction structure of the neural network 320. The object classification apparatus may merge local feature data associated with the feature data 330 among the sets of local feature data previously obtained, starting from the feature data 330. A process of merging local feature data may be repeatedly performed while descending to the lower feature extraction layer.

Such a merging process will be described in detail as follows. In a merging device 340, the feature data 330 and the feature data extracted by the feature extraction device 326 may be merged. In addition, in operation 344, a weight (or attention) may be determined based on the feature data 330 and the feature data extracted by the feature extraction unit 326, and the determined weight may be applied to the feature data extracted by the feature extraction device 326. In operation 346, the feature data 330 and weighted feature data to which the weight is applied may be merged, and merged feature data may thereby be generated. Subsequently, in a merging device 350, a data dimension conversion 352 may be performed to match a data dimension of the merged feature data generated by the merging device 340 to a data dimension of the feature data extracted by the feature extraction device 324. In operation 354, a weight may be determined based on merged feature data of which the data dimension is converted and the feature data extracted by the feature extraction device 324. The determined weight may be applied to the feature data extracted by the feature extraction device 324, and a data dimension conversion 355 may be performed to match a data dimension of weighted feature data to which the weight is applied to a data dimension of the merged feature data generated by the merging device 340. In operation 356, feature data obtained through the data dimension conversion 355 and the merged feature data generated by the merging device 340 may be merged, and merged feature data updated from the feature data extracted by the feature extraction device 324 may be generated. Subsequently, in a merging device 360, a data dimension conversion 362 may be performed to match a data dimension of the merged feature data generated by the merging device 350 to a data dimension of the feature data extracted by the feature extraction device 322. In operation 364, a weight may be determined based on merged feature data with the converted data dimension and the feature data extracted by the feature extraction device 322. The determined weight may be applied to the feature data extracted by the feature extraction device 322, and a data dimension conversion 365 may be performed to match a data dimension of weighted feature data to which the weight is applied to the data dimension of the merged feature data generated by the merging device 350. In operation 366, feature data obtained through the data dimension conversion 365 and the merged feature data generated by the merging device 350 may be merged, and merged feature data updated from the feature data extracted by the feature extraction device 322 may thereby be generated.

As described above, each of the merging devices 340, 350, and 360 may merge, with a feature vector of an image, local information extracted from each of the feature extraction devices 322, 324, and 326 to update the feature vector. The weight in each of the merging devices 340, 350, and 360 may be determined through cross-attention feature aggregation (CAFA). The data dimension conversions 352, 355, 362, and 365 may be performed by a fully-connected layer, and the merging performed in operations 346, 356, and 366 may correspond to an addition operation or an averaging operation between the feature data. However, examples are not limited thereto. The CAFA, which is a process of merging highly correlated local information in the form of a linear combination through an inner product between feature data of an upper layer and a feature map including local information, may include calculating a cross attention between two sets of feature data, and applying the cross attention to the feature data.

When merging the local feature data with the feature data 330 after obtaining the feature data 330, the object classification apparatus may merge some or all of the sets of local feature data. The object classification apparatus may merge only some necessary local feature data with the feature data 330 according to an available resource status. The number of sets of local feature data to be merged may be adjusted according to the resource status. In an example, when there are a few available resources, some of, not all of, the sets of local feature data may be merged with the feature data 330. In contrast, when there are sufficient available resources, all the sets of local feature data may be sequentially merged with the feature data 330. This merging process may correspond to bidirectional encoding of extracting local features, extracting global features, and then merging the local features.

The object classification apparatus may generate, as a result of the foregoing merging process, merged feature data 370 in which global feature data and local feature data are merged. A structure of an additional network for the merging process may be significantly smaller compared to a structure of the entire feature extraction network, and may have a considerably low increase in computation amount and resource usage in that intermediate resultant values (local feature data) calculated in the middle of feature extraction are used.

The merged feature data 370 may be input to a classifier 380, and the classifier 380 may predict a class or label of an object appearing in the input image 310 based on the input merged feature data 370. The classifier 380 may be a neural network trained to determine an object classification result based on input data. The classifier 380 may be, for example, a multilayer perceptron (MLP) neural network, but examples of which are not limited thereto. In an example, a neural network that implements the classifier 380 and a neural network 320 that extracts features of the input image 310 may be present separately, or may be implemented as a single neural network.

The object classification apparatus may perform object classification based on the merged feature data 370 including global information and local information encoded as described above. To compensate for a loss of local information of the feature data 330 including global information that may be from the lightweight neural network 320, the object classification apparatus may additionally merge related local information with the feature data 330 and may thereby improve the accuracy in object classification.

Figure 4:
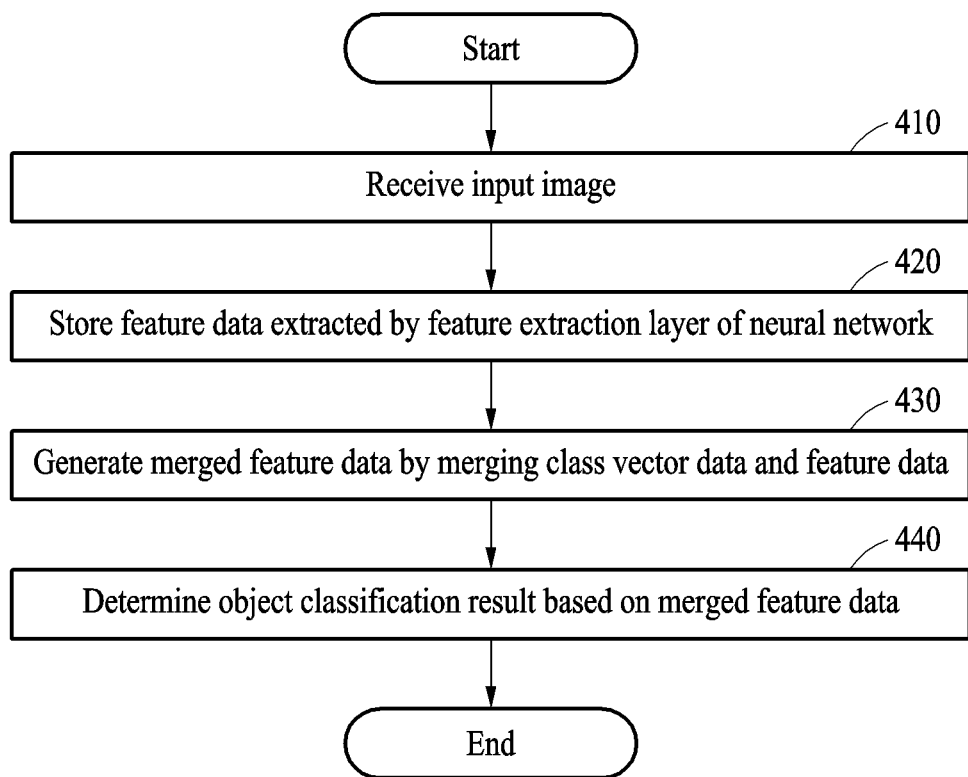
FIG. 4 illustrates an example of an object classification method, in accordance with one or more embodiments.

FIG. 4 illustrates an example of an object classification method. Operations of the object classification method to be described hereinafter with reference to FIG. 4 may be performed by an object classification apparatus, for example, the object classification apparatus 100 described above with reference to FIG. 1 or an object classification apparatus 700 to be described later with reference to FIG. 7. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, the object classification apparatus may receive an input image which is a target image on which object classification is to be performed.

In operation 420, the object classification apparatus may store feature data extracted by a feature extraction layer of a neural network configured to extract features of the input image. The object classification apparatus may store feature data extracted by each of feature extraction layers of the neural network while feature data is being extracted through the feature extraction layers of the neural network.

In operation 430, the object classification apparatus may generate merged feature data by merging class vector data corresponding to the input image and the feature data. The object classification apparatus may generate the merged feature data by sequentially merging the class vector data and the feature data extracted by the feature extraction layers.

In an example, the object classification apparatus may select one or more candidate classes from among a plurality of candidate classes for an object in the input image, and merge class vector data of the selected one or more candidate classes and the feature data to generate the merged feature data. In an example, the object classification apparatus may select top N candidate classes (N is a natural number in a range from 1 to a total number of candidate classes) having a high probability among the candidate classes for the object.

The generating of the merged feature data may include converting the class vector data such that a dimension of the class vector data corresponds to a dimension of the feature data, and merging the converted class vector data and the feature data to generate the merged feature data. Operation 430 will be described in detail later with reference to FIG. 5.

In operation 440, the object classification apparatus may determine a result of classifying the object in the input image based on the merged feature data. The object classification apparatus may determine such an object classification result based on a classifier trained to output an object classification result based on input merged feature data.

Figure 5:
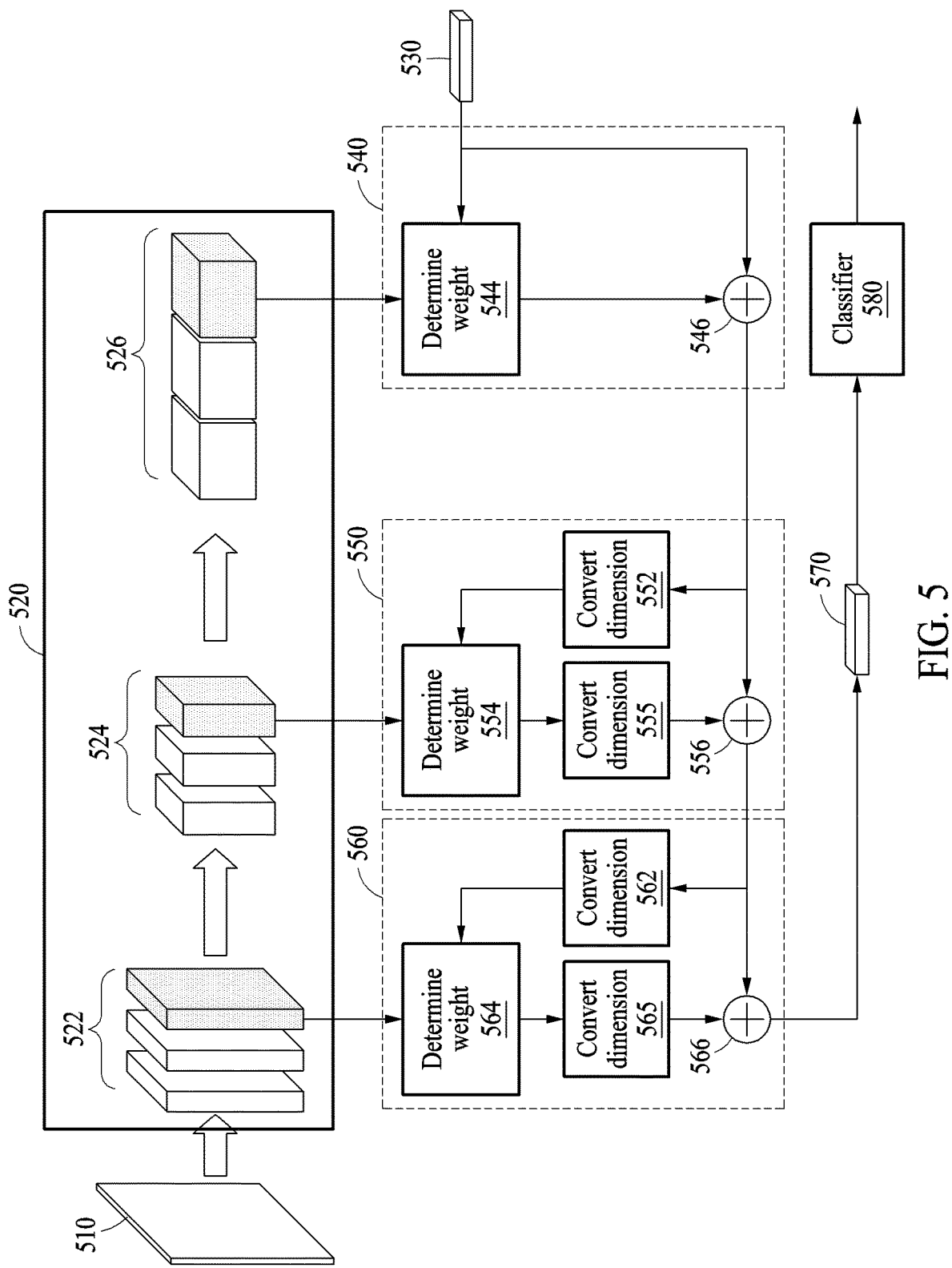
FIG. 5 illustrates an example of object classification implementing a neural network, in accordance with one or more embodiments.

FIG. 5 illustrates an example of object classification implementing a neural network, in accordance with one or more embodiments.

Referring to FIG. 5, an object classification apparatus may generate merged feature data by merging local information with a class token 530, and may determine an object classification result for an input image 510 based on the generated merged feature data. The class token 530 may be a parameter or vector data that may be learned, and may correspond to a class vector or a classification token. The class token 530 may be a unique vector value determined in a learning (or training) process of a neural network 520 and may have a set value regardless of the input image 510.

The object classification apparatus may merge local feature data extracted from each of feature extraction devices 522, 524, and 526 while passing the class token 530 down from an upper layer to a lower layer of a hierarchical feature extraction structure of the neural network 520. Although the neural network 520 is illustrated as including three feature extraction devices 522, 524, and 526 in the examples of FIGS. 5 and 6 for convenience of description, examples are not limited thereto.

In an example, for the merging, in a merging device 540, the class token 530 and feature data extracted by the feature extraction device 526 may be merged. In operation 544, a weight (or attention) may be determined based on the class token 530 and the feature data extracted by the feature extraction device 526, and the determined weight may be applied to the feature data extracted by the feature extraction device 526. In operation 546, the class token 530 and weighted feature data to which the weight is applied may be merged, and merged feature data may thereby be generated. Subsequently, in a merging device 550, a data dimension conversion 552 may be performed to match a data dimension of the merged feature data generated by the merging device 540 to a data dimension of feature data extracted by the feature extraction device 524. Additionally, in operation 554, a weight may be determined based on merged feature data of which the data dimension is converted and the feature data extracted by the feature extraction device 524. The determined weight may be applied to the feature data extracted by the feature extraction device 524. Additionally, a data dimension conversion 555 may be performed to match a data dimension of weighted feature data to which the weight is applied to a data dimension of the merged feature data generated by the merging device 540. In operation 556, feature data obtained by performing the data dimension conversion 555, and the merged feature data generated by the merging device 540 may be merged, and merged feature data updated from the feature data extracted by the feature extraction device 524 may thereby be generated. Subsequently, in a merging device 560, a data dimension conversion 562 may be performed to match a data dimension of the merged feature data generated by the merging device 550 to a data dimension of feature data extracted by the feature extraction device 522. Additionally, in operation 564, a weight may be determined based on merged feature data of which the data dimension is converted and the feature data extracted by the feature extraction device 522. The determined weight may be applied to the feature data extracted by the feature extraction device 522. Additionally, a data dimension conversion 565 may be performed to match a data dimension of weighted feature data to which the weight is applied to a data dimension of the merged feature data generated by the merging device 550. In operation 566, feature data obtained through the data dimension conversion 565 and the merged feature data generated by the merging device 550 may be merged, and merged feature data 570 updated from the feature data extracted by the feature extraction device 522 may thereby be generated.

The object classification apparatus may merge, with the class token 530, some or all of the local feature data extracted by the feature extraction devices 522, 524, and 526. The object classification apparatus may merge, with the class token 530, only some local feature data that is needed according to an available resource status.

The object classification apparatus may generate, as a result of the merging, the merged feature data 570 in which global feature data and local feature data are merged, and predict a class or label of an object in the input image 510 implementing a classifier 580 that uses the merged feature data 570 as an input.

Figure 6:
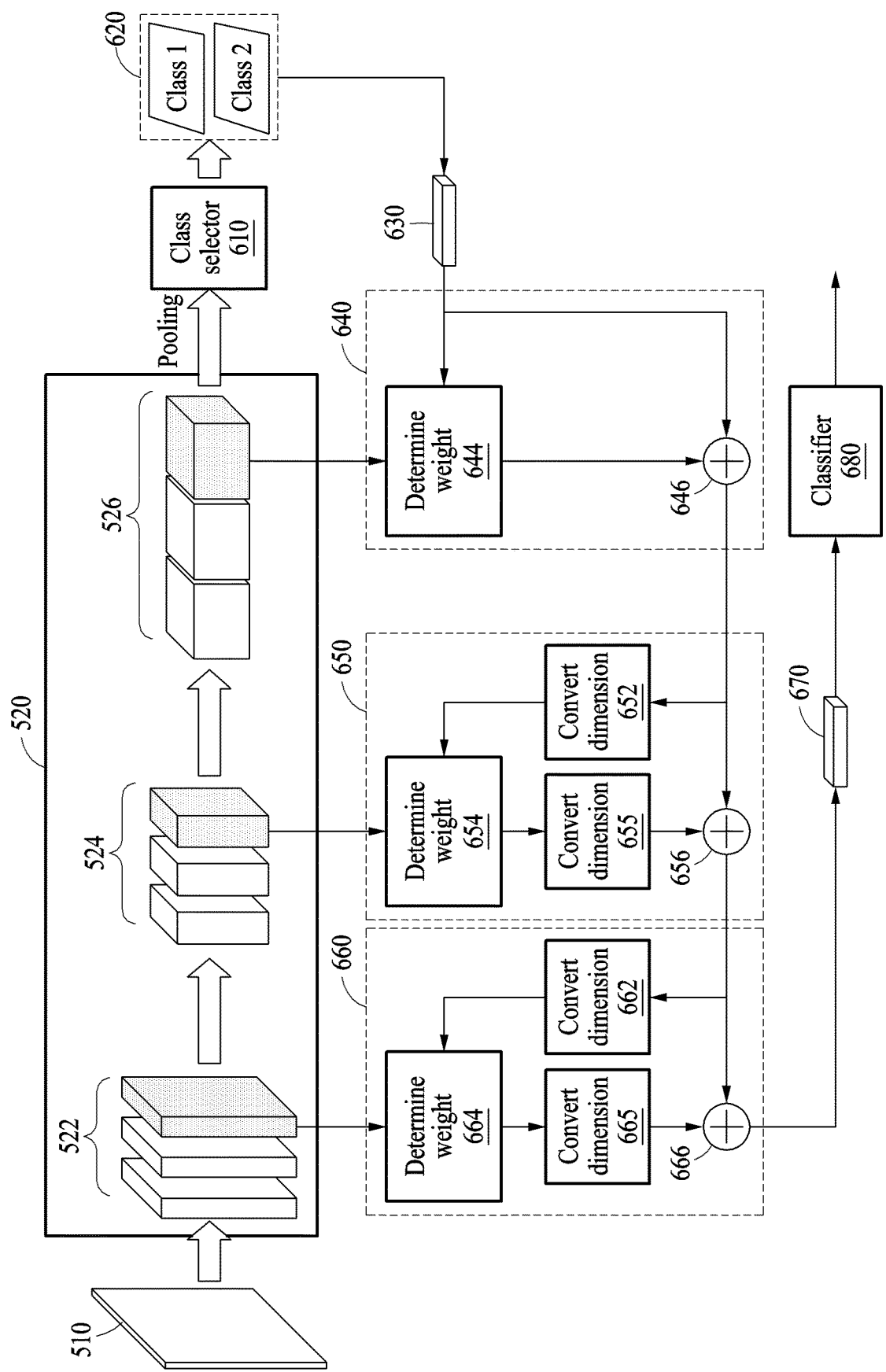
FIG. 6 illustrates an example of object classification implementing a neural network, in accordance with one or more embodiments.

FIG. 6 illustrates an example of object classification implementing a neural network, in accordance with one or more embodiments.

Referring to FIG. 6, an object classification apparatus may perform object classification on an input image 510 based on a multi-class vector. A structure and functions of a neural network 520 of FIG. 6 may be the same as the structure and functions of the neural network 520 of FIG. 5, and repeated description thereof will be omitted here.

The neural network 520 may be connected to a class selector 610. A pooling (e.g., average pooling or global average pooling (GAP)) operation may be performed on an output of the neural network 520, and a value obtained through the pooling operation may be input to the class selector 610. The class selector 610 may be implemented as a multilayer perceptron (MLP) neural network.

The class selector 610 may select one or more candidate classes from among a plurality of candidate classes (e.g., class 1, class 2, . . . , class N) for an object in an input image 510 based on the input value, and output the selected candidate classes. In an example, the class selector 610 may select and output K candidate classes in an order of greatest probability values based on a probability value of each candidate class. In this example, K is a predefined natural number. In an example, it is assumed that classes 1 and 2 620 are selected as top two candidate classes. In this example, the object classification apparatus may merge class vector data 630 of the selected classes 1 and class 2 and feature data extracted by feature extraction devices 522, 524, 526 of the neural network 520 to generate merged feature data 670 for object classification.

Specifically, for the merging, in a merging device 640, the class vector data 630 and feature data extracted by the feature extraction device 526 may be merged. In operation 644, a weight (or attention) may be determined based on the class vector data 630 and the feature data extracted by the feature extraction device 526, and the determined weight may be applied to the feature data extracted by the feature extraction device 526. In operation 646, the class vector data 630 and weighted feature data to which the weight is applied may be merged, and merged feature data may thereby be generated. Subsequently, in a merging device 650, a data dimension conversion 652 may be performed to match a data dimension of the merged feature data generated by the merging device 640 to a data dimension of feature data extracted by the feature extraction device 524. Additionally, in operation 654, a weight may be determined based on merged feature data of which the data dimension is converted and the feature data extracted by the feature extraction device 524. The determined weight may be applied to the feature data extracted by the feature extraction device 524. Additionally, a data dimension conversion 655 may be performed to match a data dimension of weighted feature data to which the weight is applied to a data dimension of the merged feature data generated by the merging device 640. In operation 656, feature data obtained through the data dimension conversion 655 and the merged feature data generated by the merging device 640 may be merged, and merged feature data updated from the feature data extracted by the feature extraction device 524 may thereby be generated. In a merging device 660, a data dimension conversion 662 may be performed to match a data dimension of the merged feature data generated by the merging device 650 to a data dimension of feature data extracted by the feature extraction device 522. In operation 664, a weight may be determined based on merged feature data of which the data dimension is converted and the feature data extracted by the feature extraction device 522. The determined weight may be applied to the feature data extracted by the feature extraction device 522. Additionally, a data dimension conversion 665 may be performed to match a data dimension of weighted feature data to which the weight is applied to a data dimension of the merged feature data generated by the merging device 650. In operation 666, feature data obtained through the data dimension conversion 665 and the merged feature data generated by the merging device 650 may be merged, and the merged feature data 670 updated from the feature data extracted by the feature extraction device 522 may thereby be generated.

The object classification apparatus may generate, as a result of the merging, the merged feature data 670 in which global feature data and local feature data are merged, and predict a class or label of an object in the input image 510 based on a classifier 680 that uses the merged feature data 670 as an input.

Figure 7:
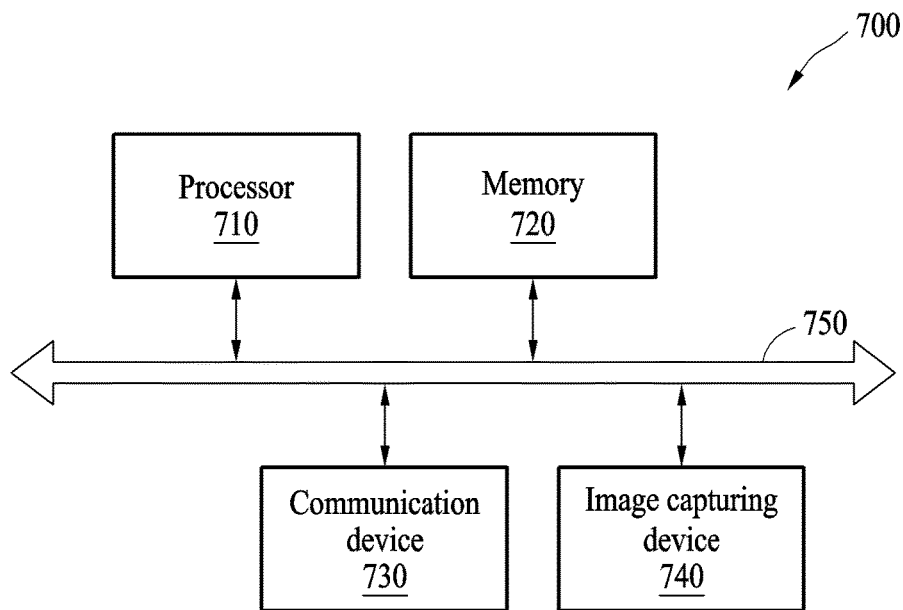
FIG. 7 illustrates an example of an object classification apparatus, in accordance with one or more embodiments.

FIG. 7 illustrates an example of an object classification apparatus, in accordance with one or more embodiments.

Referring to FIG. 7, an object classification apparatus 700 may be a computing device configured to detect an object in an input image and classify the detected object, and may correspond to the object classification apparatus 100 described above with reference to FIG. 1. The object classification apparatus 700 may perform one or more, or all, of the operations of the object classification method described herein.

The object classification apparatus 700 may include one or more processors 710, one or more memories 720, and a communication device 730, and may further include an image capturing device 740. The components of the object classification apparatus 700 may communicate with each other through a communication bus 750.

The processor 710 may control an overall operation of the object classification apparatus 700, and may execute functions and instructions to be executed in the object classification apparatus 700. The processor 710 may perform one or more of the operations described above with reference to FIGS. 1 through 6.

The processor 710 may classify an object in an input image based on feature data extracted by a neural network configured to extract features of the input image.

In an example, the processor 710 may store first feature data extracted by a first feature extraction layer of the neural network, and obtain second feature data from a second feature extraction layer which is an upper layer of the first feature extraction layer. The second feature extraction layer may be an uppermost feature extraction layer among a plurality of feature extraction layers included in the neural network. The processor 710 may generate merged feature data by merging the first feature data and the second feature data. The processor 710 may determine an object classification result based on the merged feature data and a classifier.

When generating the merged feature data, the processor 710 may generate the merged feature data by sequentially merging sets of feature data. In an example, the processor 710 may generate first merged feature data by merging the first feature data and the second feature data, and generate second merged feature data by merging the first merged feature data and third feature data extracted by a third feature extraction layer which is a lower layer of the first feature extraction layer. The processor 710 may then determine an object classification result based on the second merged feature data.

In another example, the processor 710 may store feature data extracted by a feature extraction layer of the neural network, and generate merged feature data by merging class vector data corresponding to the input image and the feature data. The processor 710 may store feature data extracted by each of feature extraction layers of the neural network, and generate the merged feature data by sequentially merging the class vector data and feature data extracted by the feature extraction layers. According to examples, the processor 710 may select one or more candidate classes from among a plurality of candidate classes for an object in the input image, and generate the merged feature data by merging class vector data of the selected one or more candidate classes and feature data. The processor 710 may then determine a result of classifying an object in the input image based on the merged feature data and the classifier.

The memory 720 may store information needed for the processor 710 to perform the operations. In an example, the memory 720 may store instructions or programs executable by the processor 710 and may store related information during the execution of software or program. The memory 720 may include a volatile memory such as a random-access memory (RAM), a dynamic RAM (DRAM), and a static RAM (SRAM), and/or a nonvolatile memory known in the art, such as, for example, a flash memory.

The communication device 730 may communicate with an external device through a wired network or a wireless network. Through the communication device 730, an input image may be transmitted to the object classification apparatus 700, or information on an object classification result may be transmitted to the outside of the object classification apparatus 700.

According to examples, the object classification apparatus 700 may further include an image capturing device 740 such as, but not limited to, a camera. The image capturing device 740 may obtain a color image, a black-and-white image, a gray image, an infrared image, and a depth image, as only examples, and may capture an input image which is a target of object classification.

Figure 8:
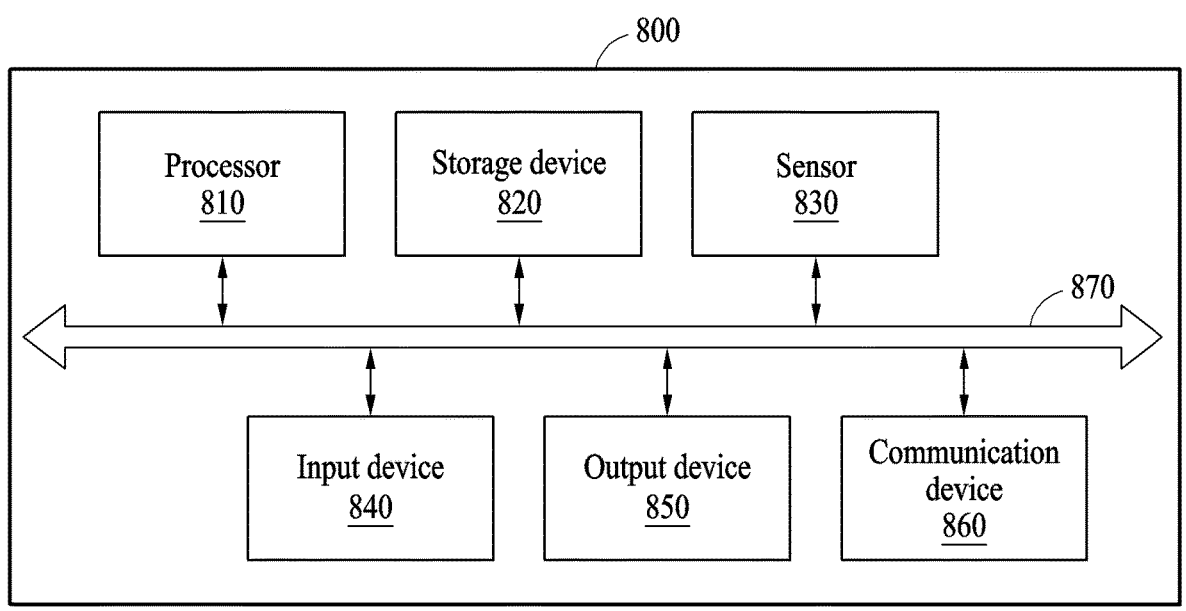
FIG. 8 illustrates an example of an electronic apparatus, in accordance with one or more embodiments.

FIG. 8 illustrates an example electronic apparatus, in accordance with one or more embodiments.

Referring to FIG. 8, an electronic apparatus 800 may be an electronic device in various forms. The electronic apparatus 800 may be, but is not limited to, a smartphone, a tablet computer, a wearable device, a netbook, a laptop computer, a product inspection device, a personal computer (PC), and a server.

The electronic apparatus 800 may include one or more processors 810, a storage device 820, a sensor 830, an input device 840, an output device 850, and a communication device 860. The components of the electronic apparatus 800 may communicate with one another through a communication bus 870. The electronic apparatus 800 may perform one or more, or all, of the operations of an object classification apparatus (e.g., the object classification apparatus 100 or the object classification apparatus 700 of FIG. 7).

The processor 810 may control an overall operation of the electronic apparatus 800 and execute functions and instructions to be executed in the electronic apparatus 800. The processor 810 may perform the operations described above with reference to FIGS. 1 through 7.

In an example, the processor 810 may store first feature data extracted by a first feature extraction layer of a neural network configured to extract features of an input image, and obtain second feature data from a second feature extraction layer which is an upper layer of the first feature extraction layer. The processor 810 may generate merged feature data by merging the first feature data and the second feature data, and determine a result of classifying an object in the input image based on the generated merged feature data.

In another example, the processor 810 may store feature data extracted by a feature extraction layer of a neural network, and generate merged feature data by merging class vector data corresponding to an input image and the feature data. The processor 810 may determine a result of classifying an object in the input image based on the generated merged feature data.

The storage device 820 may store information needed for the electronic apparatus 800 to perform the operations. In an example, the storage device 820 may store instructions or programs executable by the processor 810 and may store input/output data (e.g., a classifier and an input image). The storage device 820 may include a RAM, a DRAM, and a SRAM, a flash memory, a hard disk, a magnetic disk, an optical disc, or other types of nonvolatile memories known in the art.

The sensor 830 may include an image capturing device such as, but not limited to, an image sensor and a video sensor. The image capturing device may obtain or capture an image that is a target of object classification.

The input device 840 may receive a user input from a user through a tactile, video, audio, or touch input, as only examples. The input device 840 may include, for example, a keyboard, a mouse, a touchscreen, a microphone, or any other device that transmits a user input to the electronic apparatus 800.

The output device 850 may provide an output of the electronic apparatus 800 to a user through a visual, auditory, or tactile channel. The output device 850 may include, for example, a display panel for a liquid crystal display (LCD) or a light-emitting diode (LED)/organic LED (OLED) display, a touchscreen, a speaker, a vibration generator, or any other device that provides an output to a user. The output device 850 may provide, for example, information on a result of classifying an object in an input image.

The communication device 860 may communicate with an external device through a wired network or a wireless network (e.g., cellular communication, Bluetooth communication, short-range wireless communication, Wi-Fi communication, and infrared communication). Through the communication device 860, an input image may be transmitted to the electronic apparatus 800, or information on a result of classifying an object in the input image may be transmitted to the outside of the electronic apparatus 800.

The neural network apparatuses, the object classification apparatus 100, the neural network 320, the neural network 520, the electronic apparatus 800, and other apparatuses, devices, units, modules, and components described herein with respect to FIGS. 1-8 are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented object classification method, comprising:
   receiving an input image;
   storing first feature data extracted by a first feature extraction layer of a neural network configured to extract features of the input image;
   receiving second feature data from a second feature extraction layer which is an upper layer of the first feature extraction layer;
   generating merged feature data by merging the first feature data and the second feature data; and
   classifying an object in the input image based on the merged feature data,
   wherein the first feature data comprises a local feature of the input image, and the second feature data comprises a global feature of the input image, and
   wherein the generating of the merged feature data comprises:
      determining a weight to be applied to the first feature data;
      applying the determined weight to the first feature data and determining first feature data to which the weight is applied; and
      generating the merged feature data in which the global feature and the local feature are merged by merging the second feature data and the first feature data to which the weight is applied.

2. The method of claim 1, wherein the second feature extraction layer is an uppermost feature extraction layer among a plurality of feature extraction layers comprised in the neural network.

3. The method of claim 1, wherein the generating of the merged feature data comprises:
   performing the merging through an inner product between a feature map corresponding to the first feature data and a feature vector corresponding to the second feature data.

4. The method of claim 1, wherein the generating of the merged feature data comprises:
   converting the second feature data such that a dimension of the second feature data corresponds to a dimension of the first feature data; and
   generating merged feature data by merging the converted second feature data and the first feature data.

5. The method of claim 4, wherein the generating of the merged feature data further comprises:
converting the merged feature data such that a dimension of the merged feature data corresponds to the dimension of the second feature data.

6. The method of claim 1, wherein the generating of the merged feature data comprises:
generating first merged feature data by merging the first feature data and the second feature data; and
generating second merged feature data by merging the first merged feature data and third feature data extracted by a third feature extraction layer which is a lower layer of the first feature extraction layer,
wherein classifying the object in the input image comprises:
classifying the object in the input image based on the second merged feature data.

7. The method of claim 6, wherein the generating of the second merged feature data comprises:
converting the first merged feature data such that a dimension of the first merged feature data corresponds to a dimension of the third feature data; and
generating the second merged feature data by merging the converted first merged feature data and the third feature data.

8. A processor-implemented object classification method, comprising:
receiving an input image;
storing feature data extracted by a feature extraction layer of a neural network configured to extract features of the input image;
generating merged feature data by merging class vector data corresponding to the input image and the feature data; and
classifying an object in the input image based on the merged feature data,
wherein the generating of the merged feature data comprises:
selecting one or more candidate classes from among plurality of candidate classes for the object in the received input image; and
generating the merged feature data by merging class vector data of the selected one or more candidate classes and the feature data.

9. The method of claim 8, wherein the generating of the merged feature data comprises:
selecting one or more candidate classes from among a plurality of candidate classes for the object in the received input image; and
generating the merged feature data by merging class vector data of the selected one or more candidate classes and the feature data.

10. The method of claim 8, wherein the generating of the merged feature data comprises:
converting the class vector data such that a dimension of the class vector data corresponds to a dimension of the feature data; and
generating merged feature data by merging the converted class vector data and the feature data.

11. A non-transitory computer-readable storage medium storing instructions that, when executed by a processor, cause the processor to perform the object classification method of claim 1.

12. An object classification apparatus implementing a neural network, the apparatus comprising:
one or more processors configured to:
receive an input image;
store first feature data extracted by a first feature extraction layer of the neural network;
receive second feature data from a second feature extraction layer which is an upper layer of the first feature extraction layer;
generate merged feature data by merging the first feature data and the second feature data; and
classify an object in the input image based on the merged feature data,
wherein the first feature data comprises a local feature of the input image, and the second feature data comprises global feature of the input image, and
wherein the generating of the merged feature data comprises:
determining a weight to be applied to the first feature data;
applying the determined weight to the first feature data and determining first feature data to which the weight is applied; and
generating the merged feature data in which the global feature and the local feature are merged by merging the second feature data and the first feature data to which the weight is applied.

13. The apparatus of claim 12, wherein the second feature extraction layer is an uppermost feature extraction layer among a plurality of feature extraction layers comprised in the neural network.

14. The apparatus of claim 12, wherein the processor is further configured to:
generate first merged feature data by merging the first feature data and the second feature data;
generate second merged feature data by merging the first merged feature data and third feature data extracted from a third feature extraction layer which is a lower layer of the first feature extraction layer; and
classify the object based on the second merged feature data.

15. An object classification apparatus implementing a neural network, the apparatus comprising:
one or more processors configured to
receive an input image;
store feature data extracted by a feature extraction layer of the neural network;
generate merged feature data by merging class vector data corresponding to the input image and the feature data; and
classify an object in the input image based on the merged feature data,
wherein the generating of the merged feature data comprises:
determining a weight to be applied to the feature data;
applying the determined weight to the feature data and determining first feature data to which the weight is applied; and
generating the merged feature data by sequentially merging the class vector data and sets of feature data extracted by the feature extraction lavers.

16. The apparatus of claim 15, wherein the processor is further configured to:
select one or more candidate classes from among a plurality of candidate classes for the object in the input image; and
generate the merged feature data by merging class vector data of the selected one or more candidate classes and the feature data.

17. The apparatus of claim 15, wherein the processor is further configured to:
- store feature data extracted by each of feature extraction layers of the neural network; and
- generate the merged feature data by sequentially merging the class vector data and sets of feature data extracted by the feature extraction layers of the neural network.

* * * * *